Patented Oct. 5, 1948

2,450,435

UNITED STATES PATENT OFFICE 2,450,435

POLYMERS OF VINYL CHLORIDE PLASTICIZED WITH A DIOCTYL PHTHALATE AND LIQUID PETROLATUM

Addeline J. McGillicuddy, Spokane, Wash., assignor of one-fifth to Bennett H. Levenson, Washington, D. C., and two-fifths to Frank L. Towne or Blanche Towne, his wife, Spokane, Wash.

No Drawing. Application April 6, 1944,
Serial No. 529,813

6 Claims. (Cl. 260—31.8)

This invention relates to the art of synthetic resins. More particularly it pertains to plasticized materials of synthetic resinous derivation, and embodies among its features novelty of product, composition and method of production.

The significance of plasticizers on the characteristics of resins has been early recognized in the art and has served to stimulate research and experimentation directed to the improvement of known synthetic resins, as well as to the development of new types of resins. Thus it is known that the properties of a given resin are subject to variation merely through the expedient of a change in the proportions of a given plasticizer. Similarly the utilization of compatible plasticizers differing in their chemical properties or composition brings within the realm of expectation a further diversification of product characteristics.

This sensitivity of plasticization is well manifested by resins of polyvinyl derivation, such as those containing polymerized vinyl chloride or comprising conjoint polymers involving polyvinyl chloride. A wide field of adaptation attributable to the diversification in article characteristics attainable, is particularly applicable to the conjoint polymers of vinyl chloride and vinyl acetate. Within this latter category of conjoint polymers are the so-called "Vinylite" resins which are available in physical forms varying from the rigid type to the flexible, resilient rubber-like type.

Plasticizers most successfully utilized in connection with copolymers of vinyl chloride or vinyl acetate are esters and particularly those obtained from polybasic and aliphatic alcohols.

Despite the satisfactory product attainable with these plasticizers, there have been some uncertainties involved in their use. Illustrative of such difficulties has been the fact that the optimum type of plasticizers within this category has not been of unlimited availability. Accordingly the quantity production of synthetic resin of a given type has been necessarily dependent upon and restricted to the extent of the plasticizer available for usage. Moreover, there has been some propensity to brittleness and/or cracking by polyvinyl chloride containing resins, such as the copolymer of vinyl chloride and vinyl acetate, and other polymerizates or polymerizate mixtures containing polyvinyl chloride, at temperatures substantially below 0 degrees C. or 32 degrees F. This tendency has been applicable particularly in the case of the highly plasticized polyvinyl resins of the Vinylite type which are normally available in the form of resilient, flexible, and rubber-like sheets or films. With progressively lower temperatures, the pliability and resiliency of some of these Vinylite type elastomer sheets have shown a perceptible stiffness; and at temperatures approximating that of Dry Ice, minus 110 degrees F., the resilient, rubber-like sheet or film has actually manifested a tendency to cracking or fracture by impact or shock.

It is an object of this invention to obviate the difficulties and uncertainties hereinabove indicated.

An additional object of the invention is to obtain a polymerized vinyl resin which retains its normal properties of resiliency and flexibility at temperatures substantially below freezing.

An additional object is to attain films or sheets of the plasticized copolymerizate of vinyl chloride or vinyl acetate elastomers which retain their resiliency, flexibility and elasticity at substantially low temperatures below freezing and which manifest enhanced fatigue life at freezing temperatures.

An important object is to obtain a novel plasticizer which will reduce the extent of dependency upon polybasic acid esters for that purpose.

Still another object is obtention of a plasticizer which is compatible with the conjoint polymer of vinyl chloride and vinyl acetate as well as with polybasic acid esters utilized as plasticizers for these resins.

Another object is to devise a method for producing a plasticized resinous composition of the conjoint polymers of vinyl chloride and vinyl acetate which manifest the aforesaid advantages.

Other objects, advantages and features of the invention will become apparent from the following description which is to be treated as illustrative and not limitative.

Illustrative of the polybasic acids which have been utilized in the production of ester plasticizers for polyvinyl resins are sebacic, phthalic and phosphoric, while the alcohols which have been resorted to for making plasticizing esters have been desirably of alkyl type exemplified by the octyl alcohols. Indicative of the plasticizers within the category indicated which have been used are di-2-ethyl hexyl phthalate, dimethyl Cellosolve phthalate, dibutyl Cellosolve phthalate, methyl phthalyl ethyl glycolate, di(chloroethoxy ethyl) phthalate, tributyl glycerol triphthalate, dibutyl phthalate, butyl phthalyl butyl glycolate.

In the production of the rubber-like conjoint polymer corresponding to the "Vinylite" elastomer sheet, the optimum type of plasticizer has been the dioctyl phthalate such as di-2-ethyl hexyl phthalate. However, these materials are not of unlimited availability and the production of optimum Vinylite products desirably utilizing such a plasticizer has been, at intervals, necessarily restricted.

It has been ascertained within the purview of this invention that certain types of oils may be effectively resorted to for reducing the quantity of the optimum type of plasticizers hereinabove noted without detrimentally affecting the desirable characteristics of the resinous product obtainable and in fact enhancing some of the properties of the resin heretofore produced by utilization of such phthalate ester plasticizers.

The oils contemplated by the invention are such as manifest definite compatibility with respect to the vinyl ester resin, as well as with the phthalate plasticizer, including the optimum compounds, such as a dioctyl phthalate plasticizer, such as di-2-ethyl hexyl phthalate. Among such oils are those which do not yield paraffin, whether or not paraffin is contained therein, essentially comprising refined substantially paraffin-free mineral or petroleum oils. The oils which especially satisfy the plasticizer requirements for production of the plasticized copolymerizate of vinyl chloride and vinyl acetate, such as the rubber-like sheet of Vinylite "V" or Vinylite "X," broadly fall within the definition of a refined mineral oil, which comprises high-boiling distillate obtained from certain oils which do not yield paraffin.

An optimum embodiment of such oil is that referred to as liquid petrolatum or "mineral oil." The liquid petrolatum may or may not contain paraffin, but if present, the paraffin should be present in a state whereby it is not susceptible to removal, at least under normal conditions. Thus liquid petrolatum is defined as the oil which is obtained by the distillation of that portion of petroleum which boils between 330 degrees C. and 390 degrees C., and is obtained after removal of the lighter constituents of the petroleum; the distillate fraction obtained between 330 degrees C., and 390 degrees C., is subjected to a comprehensive purification treatment with sulphuric acid and caustic soda, followed by filtration while hot through a decolorizing carbon. On cooling said purified fraction, some solid paraffin separates out, and the liquid portion is subjected to redistillation, with that portion boiling above 360 degrees C., being retained as the liquid petrolatum.

While liquid petrolatum or "mineral oil" as generally available, especially when in accordance with the requirements of the U. S. Pharmacopoeia, satisfies the said details of production, it will be understood that within the scope of the present invention, a reasonable latitude as to the characteristics of the product may be contemplated. Thus, the temperature range indicated for the distillate fractions may be deviated within a reasonable scope without unduly affecting the plasticizer value of the fraction for purposes of the present invention.

The extent to which the phthalate ester, such as a dioctyl phthalate, is replaceable by "mineral oil" as a plasticizer for the vinyl ester resin, may be as much as approximately 30% the phthalate ester to provide a resin of predetermined plasticity. The optimum proportioning of the "mineral oil," should preferably not exceed approximately 25% of the phthalate which would otherwise be used. Thus where proportioning of the phthalate, such as in the production of the rubber-like Vinylite type of material is substantially 40 parts, in accordance with the present invention 30 parts of the phthalate may comprise an optimum proportioning in conjunction with 10 parts of liquid petrolatum.

While a greater replacement of the phthalic ester in terms of its normal requirements may be resorted to where this proportioning materially exceeds 25%-30%, there is some tendency manifested by the resin to "bleed" the excess oil utilized.

On the other hand, the retention of the "mineral oil" or the liquid petrolatum content within the maximum proportion of 25%-30% indicated results in the production of a plasticized vinyl resin, such as plasticized copolymerized vinyl chloride-vinyl acetate manifesting the desirable attributes of the plasticized product obtained through the use of the dioctyl phthalate exclusively, and at the same time provides a resistance to brittleness, and a value for fatigue life at substantially low temperatures not heretofore attainable. Differently stated, where the resin product previously required 40 parts of a dioctyl phthalate, the substitute therefor of 30 parts of said ester and 10 parts of liquid petrolatum, provides a product which manifests properties of room temperature flexibility and abrasion loss satisfactorily comparable with that of the resin resulting from the dioctyl plasticization alone, while at temperatures of freezing, or substantially below, the fatigue life, or wearing characteristics of the resin, and the resistance toward brittleness or cracking, are enhanced.

Further illustrative of the scope and purport of the invention are the following examples of desirable formulation indicating reagents and their proportions, and an example of what may be termed a standard Vinylite VYNW composition for purposes of comparison:

I

*Standard composition*

| | Parts |
|---|---|
| Vinylite VYNW | 60 |
| Dioctyl phthalate | 40 |
| Fractol A | |
| Lead acetate | 1.2 |

II

| | Parts |
|---|---|
| Vinylite VYNW, resin | 60 |
| Dioctyl phthalate, plasticizer | 30 |
| Fractol A, liquid petrolatum | 10 |
| Lead acetate, stabilizer | 1.2 |

III

| | Parts |
|---|---|
| Vinylite, resin | 60 |
| Dioctyl phthalate, plasticizer | 36 |
| Fractol A, liquid petrolatum | 4 |
| Lead acetate, stabilizer | 1.2 |

Vinylite VYNW comprises the copolymerizate of substantially 93%-95% of vinyl chloride, the difference of this figure from 100% being the vinyl acetate. Fractol A is a "mineral oil" available in commerce, which satisfies the standards of the U. S. Pharmacopoeia relative to liquid petrolatum. As indicated the lead acetate is utilized in minor proportion as a stabilizing ingredient. It is to be understood that other "mineral oils" which satisfy the requisites of the present disclosure, other than Fractol A, may be used; similarly the stabilizer is subject to variation within the field of such materials known to the art. While perfecting ingredients, such as fillers, pigments, opacifiers, oxidation inhibitors et cetera, are not indicated by the examples, their embodiment in the plasticized composition does not depart from the scope of the invention.

Optimum results are attainable with di-2-ethyl hexyl phthalate as a plasticizer, but other phthalates or esters of polybasic acids may be utilized in lieu of the optimum plasticizer and in combination with the "mineral oil" to attain a reasonable element of plasticizing effectiveness.

The proportioning of the phthalate ester to "mineral oil" is subject to variation within the scope of desirable results. Thus in Example II, the liquid petrolatum comprises 33.3% of the dioctyl phthalate content, whereas in Example III the relationship is approximately 11.1%. Comparing the "mineral oil" of Example II with that of the standard composition, the proportion of reduction in phthalate requirement is 25% and in example III it is 10%.

The liquid petrolatum may be embodied in the resin as a separate ingredient, or in admixture with the ester plasticizer. Accordingly the optimum plasticizer composition of Example II, when utilized in admixture, comprises 75% of phthalate and 25% of "mineral oil"; similarly an admixture of the plasticizer materials of Example III involves 90% of the dioctyl phthalate and 10% of liquid petrolatum.

As previously indicated, the plasticizer proportioning of Examples II and III both provide satisfactory results. There have however, been indications to the effect that the optimum rubber-like Vinylite elastomer in sheet form comprising the conjoint polyomer of vinyl chloride and vinyl acetate involves the proportioning of Example II, namely, 75% of the phthalate which would otherwise be utilized, where the plasticizers are the dioctyl phthalate and liquid petrolatum. However, in the case of another phthalate ester utilized with liquid petrolatum, the optimum product may be nearer the 10% figure of ester replacement by the "mineral oil."

By way of illustration of a satisfactory procedure for producing the rubber-like Vinylite sheet embodying the plasticizer combination, the phthalate ester and liquid phthalate in predetermined proportions are admixed with the conjoint polymer of vinyl chloride and vinyl acetate, which is initially in powdered form. It will be understood that the said conjoint polymer corresponds with a predetermined content of vinyl chloride and vinyl acetate, preferably containing between 93% and 95% of the former. The mixture of powder with plasticizer reagents need not necessarily be complete, a rough mix providing satisfactory results. Similarly the mixing treatment may be at elevated temperature, although this is essentially discretionary. By way of reiteration, the phthalate and oil may be supplied separately to the resin powder or as a mixture. Having obtained the mass of resin and plasticizer reagents in predetermined proportion and at least roughly agitated, the mass may then be permitted to stand for a reasonable interval of time, such as 12 hours or more, in order to facilitate the blending of the resin with the plasticizer reagents. After this interval of curing, the resin-plasticizer mass may be advantageously subjected to a two roll mill for purposes of homogenizing the mass; the rollers may advantageously be heated, such as to a temperature of at least 240 degrees F. From the homogenizing treatment of the roll mill, the plasticized composition is desirably conveyed to a calender for treatment, the temperature of the calendering operation similarly being approximately 240 degrees F., or higher.

The product resulting from the calendering operation comprises a uniform sheet of predetermined thickness. This material manifests flexibility, resiliency and fatigue life or wear properties which are favorably comparable with the room temperature characteristics of a similar Vinylite material utilizing the phthalate ester exclusively. Moreover, the flexibility, exemplified by resistance to cracking, and fatigue life at freezing temperatures or materially below the same, manifest substantial improvement over the material produced in accordance with the conventional practice. In fact the tests of the material produced in accordance with the present invention have shown a retention of the said flexibility, i. e. resistance to cracking and wear properties at —40 degrees C., and even lower.

As previously stated, the composition comprising dioctyl phthalate and liquid petrolatum represents an optimum plasticizer within the purview of this disclosure, but the scope of the invention is not intended to be limited to this extent. It will be seen that the plasticizer may be any other phthalate derivative utilizable for that purpose, as evidenced by the alkyl phthalates which have found adaptation in the plasticizer art. Similarly, although liquid petrolatum manifests distinct optimum characteristics as a replacement plasticizer for the polybasic acid esters, any other compatible oil may be utilized with more or less effectiveness; in this category are hydrocarbon oils of vegetable or animal derivation, such as neat's-foot oil.

Likewise the method of incorporating the plasticizer composition as described comprises an optimum embodiment of procedure, but there is no intent to be restricted as to details thereof. It is sufficient that the plasticizer substances be embodied within the resinous material in any expedient manner to attain the desired plasticized resin. Similarly, while the disclosure of the invention has been primarily based upon a preferred adaptation directed to the production of a flexible, rubber-like sheet of the copolymerizate of vinyl chloride-vinyl acetate, advantages are also obtainable in its adaptation to other physical forms or manifestations of the resin. Thus where the Vinylite resin is a modification having essentially rigid properties, advantages may be also obtained in connection with the replacement of a proportion of the plasticizer normally utilized in the production of that type of resin.

While I have described my invention in accordance with the preferred embodiments of both product, composition and method, it is apparent that many variations and modifications, both as to product and procedural details and steps may be made without departing from the scope of equivalents within the purview of this invention as defined in the following claims.

I claim:

1. The method of preparing a plasticized conjoint polymer of vinyl chloride-vinyl acetate which comprises mixing said conjoint polymer in powdered form with a plasticizing composition consisting of a mixture containing a dioctyl phthalate and liquid petrolatum, the content of said liquid petrolatum being in the range of 10% to 30% of the said plasticizer mixture, blending said mixture, rolling and calendering said mixture at a temperature of at least approximately 240 degrees F.

2. The method of producing a rubber-like resinous composition in sheet form which comprises mixing a copolymerizate of vinyl chloride and vinyl acetate in powdered form with a plasticizer composition consisting of a mixture containing a dioctyl phthalate and liquid petrolatum in the proportion of 75% of the former and 25% of the latter, the vinyl chloride in the resin being present in preponderant proportion, blending said mixture, rolling and calendering said mixture at a temperature of at least 240 degrees F.

3. The method of producing a rubber-like resinous composition in sheet form which comprises mixing a copolymerizate of vinyl chloride and vinyl acetate in powdered form with a plasticizer composition consisting of a mixture containing a dioctyl phthalate and liquid petrolatum in the proportion of 90% of the former and 10% of the latter, the vinyl chloride in the resin being present in preponderant proportion, blending said mixture, rolling and calendering said mixture at a temperature of at least 240 degrees F.

4. A resinous composition comprising a polymer of vinyl chloride and a plasticizer mixture consisting of a dioctyl phthalate and liquid petrolatum, the content of said liquid petrolatum being in the range of 10% to 30% of said plasticizer mixture.

5. A resinous composition containing a conjoint polymer of vinyl chloride and vinyl acetate, and a plasticizer mixture consisting of a dioctyl phthalate and liquid petrolatum, the content of said liquid petrolatum being in the range of 10% to 30% of said plasticizer mixture.

6. A resinous composition containing a conjoint polymer of vinyl chloride and vinyl acetate, and a plasticizer mixture consisting of di-2-ethyl hexyl phthalate and liquid petrolatum, the content of said liquid petrolatum being in the range of 10% to 25% of said plasticizer mixture.

ADDELINE J. McGILLICUDDY.

REFERENCES CITED

The following references are of record in the file of this patent:

UNITED STATES PATENTS

| Number | Name | Date |
|---|---|---|
| 2,104,408 | Wiezewich | Jan. 4, 1938 |
| 2,181,481 | Gray | Nov. 28, 1939 |
| 2,191,056 | Wick | Feb. 20, 1940 |
| 2,215,590 | Maverick | Sept. 25, 1940 |
| 2,238,730 | Houffe | Apr. 15, 1941 |
| 2,349,413 | Hemperly | May 23, 1944 |

OTHER REFERENCES

The Pharmacopoeia of the United States of America, Eleventh Decennial Revision, page 281.

Gruse and Stevens: The Chemical Technology of Petroleum, McGraw-Hill, 1942, pages 294, 545, 546, 550, 551, 629, and 631.